United States Patent [19]
Lee

[11] Patent Number: 5,243,515
[45] Date of Patent: Sep. 7, 1993

[54] SECURE TELEPROCESSING BIDDING SYSTEM

[76] Inventor: Wayne M. Lee, 200 Deer Creek Dr., Matthews, N.C. 28105

[21] Appl. No.: 605,361

[22] Filed: Oct. 30, 1990

[51] Int. Cl.$^5$ .................... G06F 15/22; G06F 15/20
[52] U.S. Cl. .................... 364/401; 364/408; 364/406; 379/88; 379/92
[58] Field of Search ............... 364/401, 408, 419, 406, 364/411; 273/243, 256; 379/88-93, 204

[56] References Cited

U.S. PATENT DOCUMENTS

| | | | |
|---|---|---|---|
| 4,866,756 | 9/1989 | Crane et al. | 379/88 |
| 4,926,325 | 5/1990 | Benton et al. | 364/408 |
| 5,117,358 | 5/1992 | Winkler | 364/419 |

FOREIGN PATENT DOCUMENTS 63-272608  5/1990  Japan .

OTHER PUBLICATIONS

Business Week, Jan. 19, 1989 p. 90c, "At this auction you can bid by computer", (Abstract only).

*Primary Examiner*—Roy N. Envall, Jr.
*Assistant Examiner*—Frantzy Poinvil
*Attorney, Agent, or Firm*—Ralph H. Dougherty

[57] ABSTRACT

An improved system and apparatus for conducting secret bidding procedures. The apparatus provides for the reception of bidding data for a particular bid recipient in a particular division of a particular job. Once received, this information is stored and processed electronically. The bid information is collected until a preset date when the system automatically transmits a bid report detailing the bidders and their associated bids to each bid recipient. At a second preset date the system transmits a bid comparison report revealing only the amount of each bid to each of the bidders who submitted a bid for the particular division.

15 Claims, 9 Drawing Sheets

TO: NAME OF GENERAL CONTRACTOR    SECURITY CODE _______ TIME/DATE _______

ADDRESS __________________________________________

FAX NUMBER _______________    PHONE NUMBER _______________

FROM: BID-DIAL SYSTEM           PROJECT NO. 543

RE: THIS IS A COMPOSIT BID DOCUMENT OF SUBBIDS FOR PROJECT NO 543

| PROJ DIV | BIDDER NAME | PHONE | BASE BID | ALT 1 | ALT 2 | ALT 3 | ALT 4 | ALT 5 | ALT 6 |
|---|---|---|---|---|---|---|---|---|---|
| 543-1000 | BIDDERNAME | (123) 456-7890 | 000,000 | 0000 | 0000 | 0000 | 0000 | 0000 | 0000 |
| 543-1000 | BIDDERNAME | (123) 456-7890 | 000,000 | 0000 | 0000 | 0000 | 0000 | 0000 | 0000 |
| 543-1000 | BIDDERNAME | (123) 456-7890 | 000,000 | 0000 | 0000 | 0000 | 0000 | 0000 | 0000 |
| 543-1000 | BIDDERNAME | (123) 456-7890 | 000,000 | 0000 | 0000 | 0000 | 0000 | 0000 | 0000 |
| 543-1500 | | | | | | | | | |
| 543-1500 | | | | | | | | | |
| 543-1500 | | | | | | | | | |
| 543-1500 | | | | | | | | | |
| 543-2000 | | | | | | | | | |
| 543-2000 | | | | | | | | | |
| 543-2500 | | | | | | | | | |
| 543-2500 | | | | | | | | | |
| 543-3000 | | | | | | | | | |
| 543-3000 | | | | | | | | | |
| 543-3500 | | | | | | | | | |
| 543-3500 | | | | | | | | | |
| 543-3500 | | | | | | | | | |
| 543-4000 | | | | | | | | | |
| 543-4000 | | | | | | | | | |
| 543-4000 | | | | | | | | | |
| 543-4000 | | | | | | | | | |
| 543-1000 | | | | | | | | | |
| 543-1000 | | | | | | | | | |
| 543-1000 | | | | | | | | | |
| 543-1000 | | | | | | | | | |
| 543-5000 | | | | | | | | | |
| 543-5000 | | | | | | | | | |
| 543-5000 | | | | | | | | | |

————— BIDDER IDENTITIES ARE INCLUDED

Fig.3

BIDDER: (BIDDER SECURITY NUMBER, NAME, ADDRESS, PHONE AND FAX NUMBER)

BID RECIPIENT: (BID RECIPIENT SECURITY NUMBER, NAME, PHONE AND FAX NUMBER)

| PROJ DIV | BIDDER NAME | PHONE | BASE BID | ALT 1 | ALT 2 | ALT 3 | ALT 4 | ALT 5 | ALT 6 |
|---|---|---|---|---|---|---|---|---|---|
| 543-1000 | | | 000,000 | 0000 | 0000 | 0000 | 0000 | 0000 | 0000 |
| 543-1000 | | | 000,000 | 0000 | 0000 | 0000 | 0000 | 0000 | 0000 |
| 543-1000 | | | 000,000 | 0000 | 0000 | 0000 | 0000 | 0000 | 0000 |
| 543-1000 | | | 000,000 | 0000 | 0000 | 0000 | 0000 | 0000 | 0000 |

——— BIDDER IDENTITIES ARE OMITTED

Fig.4

BIDDER WORKSHEET

FIRST NUMBER     SECOND NUMBER

(BIDDER NUMBER) _____    (PROJECT-DIV NUMBER) _____ - _____

INSTRUCTIONS

SECURE TELEPROCESSING BIDDING SYSTEM

FIELD OF THE INVENTION

The present invention relates to a method and apparatus for indisputably eliminating bid procedure violations, and more particularly to apparatus and methods for the creation of a secret bidding process utilizing commonly available electronic communications and processing means.

BACKGROUND OF THE INVENTION

In the construction business, a typical secret competitive bidding procedure calls for several general contractors to rendezvous with an architect when, at a prescribed deadline, each general contractor gives the architect a sealed envelope containing their respective written bids for a particular project. The architect then opens the bids in the general contractor's presence and reads aloud the identity of each bidder and the amounts of each bid. Bids are typically passed around for each general contractor to see.

Such a procedure has several desirable characteristics. First, bids are secure and secret as between bidders. Each bidder only knows his own bid until the reading of bids at the awarding of the contract. Second, as the process is open to everyone in a public forum, bids cannot be submitted after the bid deadline. Thus, no one has an opportunity to change his bid after the bid deadline. Third, the bidder submitting the lowest bid is publicly identified, and the bid recipient is encouraged to commit then and there to awarding the contract to the lowest bidder. Finally, after the process has been completed the bidders can find out the amounts of their competitors bids, contributing to the improvement of their skills in subsequent bidding procedures.

Prior to the general contractor/architect bid opening, the general contractor formulates his bid by conducting a competitive sub-bidding procedure mandated by the architect, wherein subcontractors submit sub-bids to the general contractor until a prescribed deadline. The quantity of sub-jobs which must be performed is generally determined by the architect who divides the project into several dozen standardized divisions of work for which, in the case of a public job, any qualified subcontractor may submit sub-bids to one or more of the general contractors bidding on the job. Such sub-bids are usually submitted by telephone. This leads to a situation where the general contractor knows both the amount and who submitted the sub-bid, while the subcontractors only know the amount of their individual sub-bids. In such a situation it is easy for the general contractor to abuse his position of knowledge, and either award the contract for political reasons or to use his knowledge to coerce the subcontractors to lower their bids. As there is presently no way to compel general contractors to observe any rules, it cannot be assured that a qualified subcontractor who submits the lowest legitimate sub-bid will be awarded a contract.

Unfortunately, prior to applicant's invention, it has not been economically viable to correct this sad state of affairs. Assuming that the general contractor bids on two to three jobs a week, each having a dozen divisions, the sheer volume of administrative tasks involved in handling a sub-bidding procedure similar to the contractor/architect procedure would quickly overwhelm the offices of many a general contractor. Such a procedure would also be onerous for the subcontractor who typically bids on two to three jobs per week.

Applicant's invention provides a viable, secret, competitive, sub-bidding system which affords subcontractors all the safeguards that are in place in the general contractor/architect bidding procedure.

DESCRIPTION OF THE PRIOR ART

Applicant is aware of the following U. S. Patents concerning electronic bidding systems.

| U.S. Pat. No. | Inventor | Issue Date | Title |
| --- | --- | --- | --- |
| 4,598,367 | DeFrancesco | 07-01-1986 | FINANCIAL QUOTATION SYSTEM USING SYNTHESIZED SPEECH |
| 4,677,552 | Sibley | 06-30-1987 | INTERNATIONAL COMMODITY TRADE EXCHANGE |

DeFrancesco '367 pertains to an automated financial data disclosure system, more specifically to a method and apparatus for audibly eliciting input information and for audibly announcing financial disclosure information computed on the basis of the input information.

Sibley '552 relates to a trade exchange system and in particular to a world trade exchange having a central exchange host for providing international commodity information and a plurality of local exchanges in various sites around the world wherein a plurality of user computer terminals coupled to each of the local exchanges can request and receive data representing marketing information directly from the central exchange host and transmit data representing bids and offers to its local exchange.

SUMMARY OF THE INVENTION

The invention provides apparatus for the reception, storing and processing, via currently available electronic communication means including telephone, modem or fax, of bidding data. Once received, the bid is stored electronically, either through the use of analog to digital translators, or the intervention of a human operator. The bid information is collected and stored until a preset date and/or time when the system automatically and simultaneously transmits bid documents containing all pertinent bid information to each of the bid recipients subscribing to the system. At a second preset date the system simultaneously transmits a bid comparison report to each of the bidders. This comparison report reveals the amount of each bid without revealing the identity of any particular competitor.

The apparatus consists of a central processing unit with sufficient power to handle the volume of transactions for any given specific situation, a keyboard input unit, video display unit, and modem/fax board connected to the central processing unit, and an associated printer capable of printing at a sufficient speed for the quantity of transactions involved.

OBJECTS OF THE INVENTION

The principal object of the present invention is to provide a secure teleprocessing bidding system in which bid procedure violations are eliminated by ensuring the secrecy and confidentiality of bids until an appropriate predetermined time.

A further object of this invention is to provide a method of educating subcontractors about their competitor's bids without destroying the bidding process.

Another object of the invention is to provide a secure bidding system that is adaptable and conformable to the basic mechanics of the bidding process as it currently exists.

A further object of the invention is to provide a user friendly secure bidding system.

A further object of this invention is to provide a bidding system that promotes fairness in bidding on publicly financed jobs.

BRIEF DESCRIPTION OF THE DRAWINGS

The foregoing and other objects will become more readily apparent by referring to the following detailed description and the appended drawings in which.

DETAILED DESCRIPTION

In its preferred embodiment, the invention provides an alternative to the contractor/subcontractor bidding system as it now exists while retaining the structure of the system. The invented system keeps track of several projects, each having several general contractors bidding for the right to do the construction. Each project has several predefined divisions of work for which subcontractors submit bids to each relevant general contractor for the right to perform the work described in a division. The invented system provides a simplified method for the submission of bids to several general contractors, each bidding on a single project.

Figure 1:
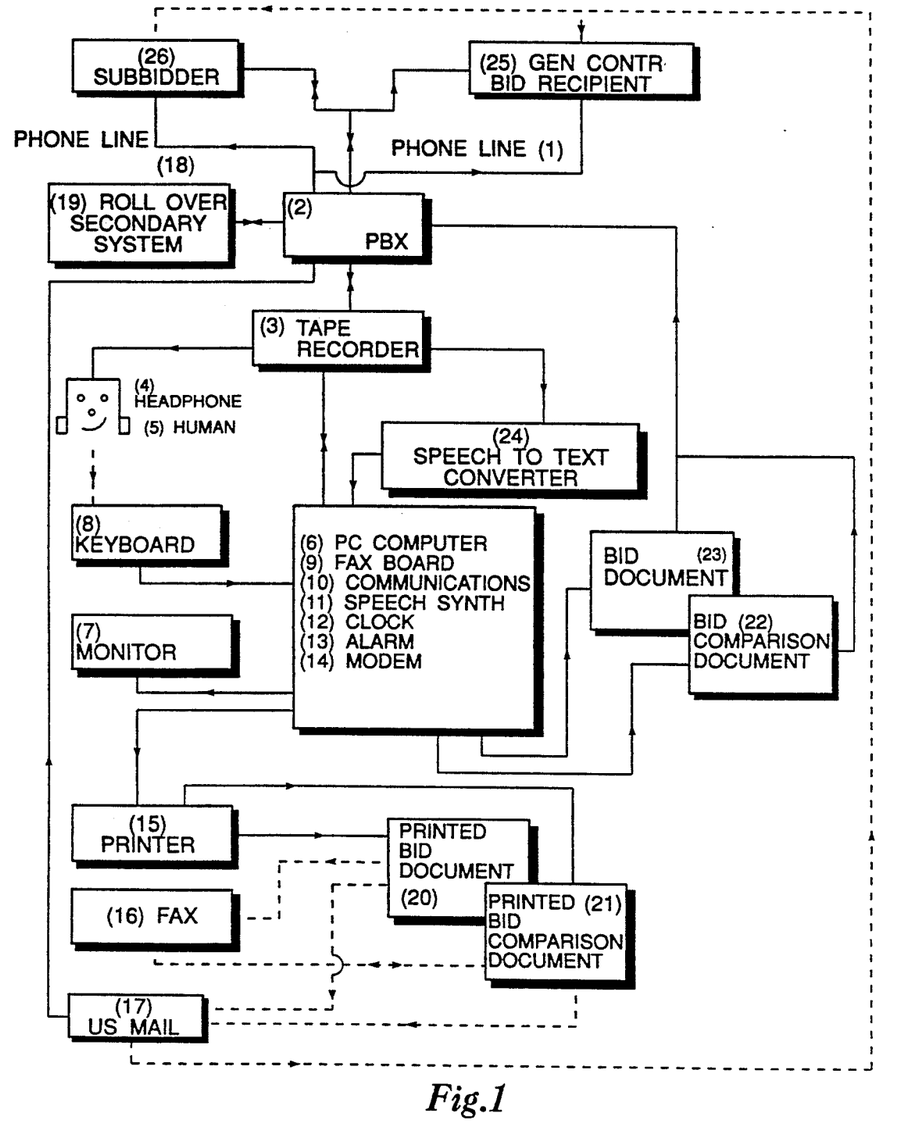
FIG. 1 is block diagram of the invented secure teleprocessing bidding system.

Referring now to the drawings, and particularly to FIG. 1, the invented secure teleprocessing bidding system includes a PC computer system 6 provided with a fax card 9, a modem 14, speech synthesizer 11, speech-to-text converter 24, clock 12, keyboard 8, monitor 7, and printer 15. Access to the system is provided via a PBX telephone system 2 and/or a fax machine 16 connected to phone line 1. The PBX unit can also provide access to a roll over secondary unit 19 if the primary unit is occupied. A tape recorder 3 provides an audio backup of the transactions as well as an audit trail. Finally, an optional human operator 5 listening via headphones 4 is provided for.

Figure 4:
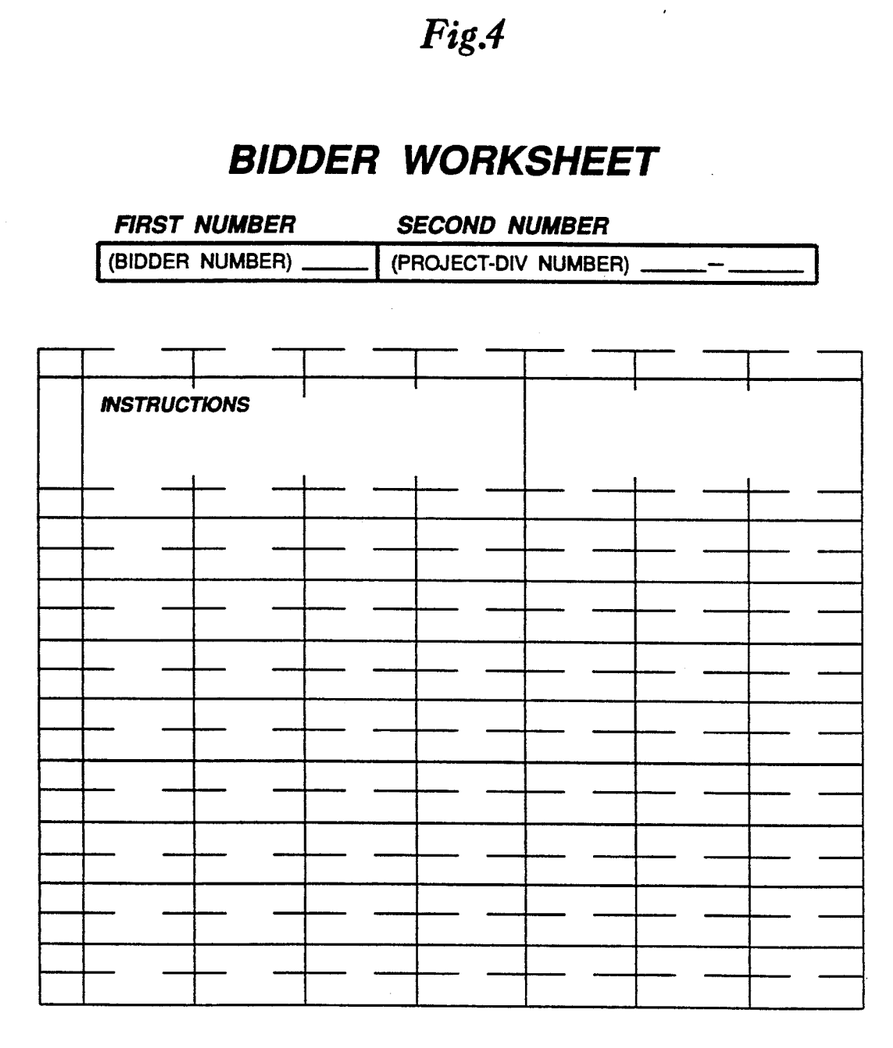
FIG. 4 is a bidder work sheet for the secure teleprocessing bidding system.
Figure 5:
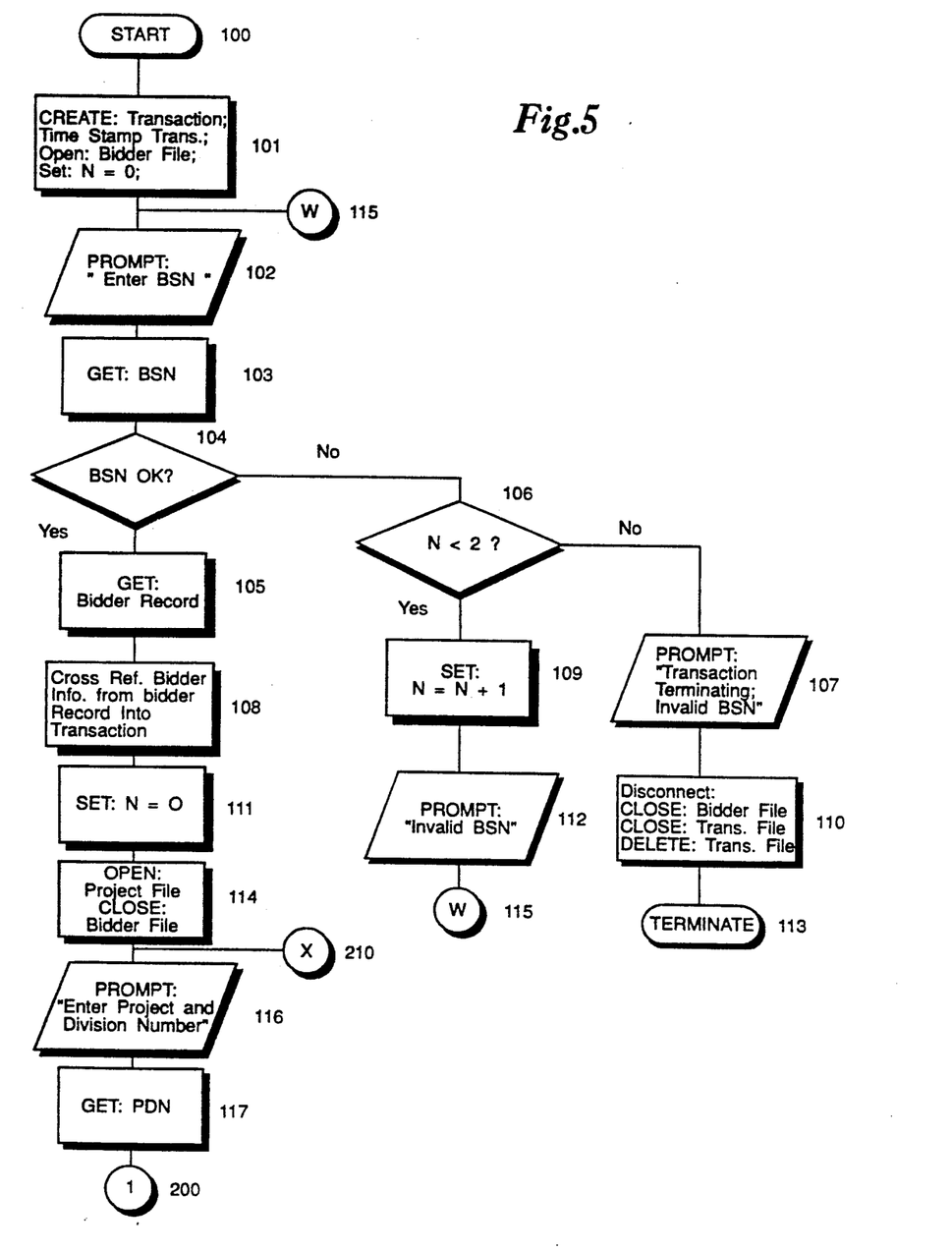
FIGS. 5 through 8 are a flow chart of the preferred embodiment of the invented system.

The secure teleprocessing bidding system provides a transaction processing system, wherein each bid is related to a specified bid recipient, i.e., the general contractor, for a specified division in a specified project. To provide an audit trail, both a tape recording and an electronic recording can be made of each transaction. To initiate the process, the bidder, i.e. the subcontractor, fills out a work sheet similar to that shown in FIG. 4. The bidder then enters this transaction into the system via modem, fax, or a voice phone call. As such bids are currently entered via phone, in the preferred embodiment the bidder phones the system and is routed via PBX 2 into the secure teleprocessing bidding system.

While a speech-to-text converter 24 can be used to eliminate the human element 5 of this system, such converters can produce inconsistent results due to variants in individual speech patterns. Therefore in the preferred embodiment a human operator 5 listens to the transaction via headphone 4, and performs the data entry on keyboard 8 for the system. In order to provide maximum security in a situation where the human element is present, the operator should be unable to speak to the bidder, thus the PC computer 6 is programmed to provide the necessary prompts via speech synthesizer 11. In such an embodiment the human operator is acting merely as a translator or speech-to-text converter for the PC computer. This function can also be performed by the bidder by keying in his transaction on the telephone keypad in the situation where the bidder is more technically oriented.

Figure 6:
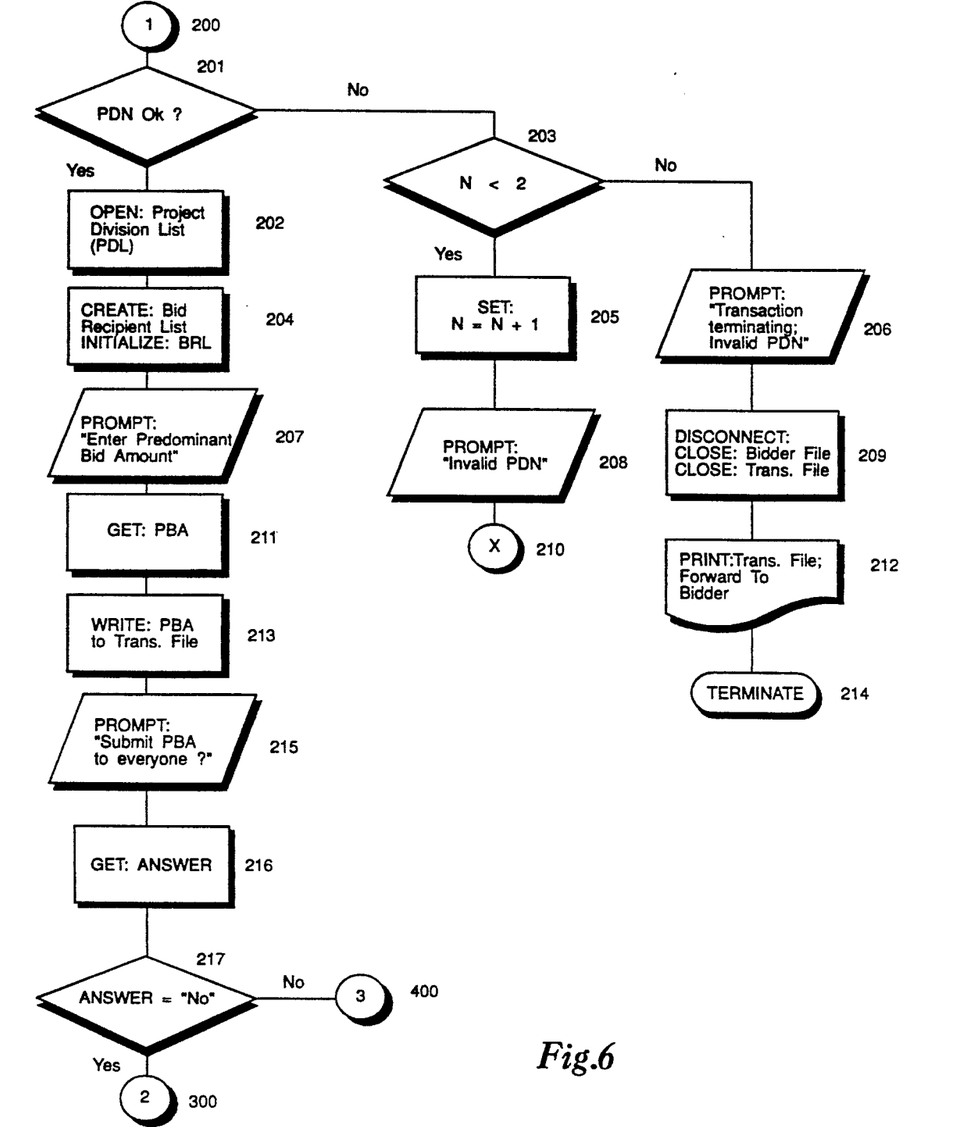
Figure 7:
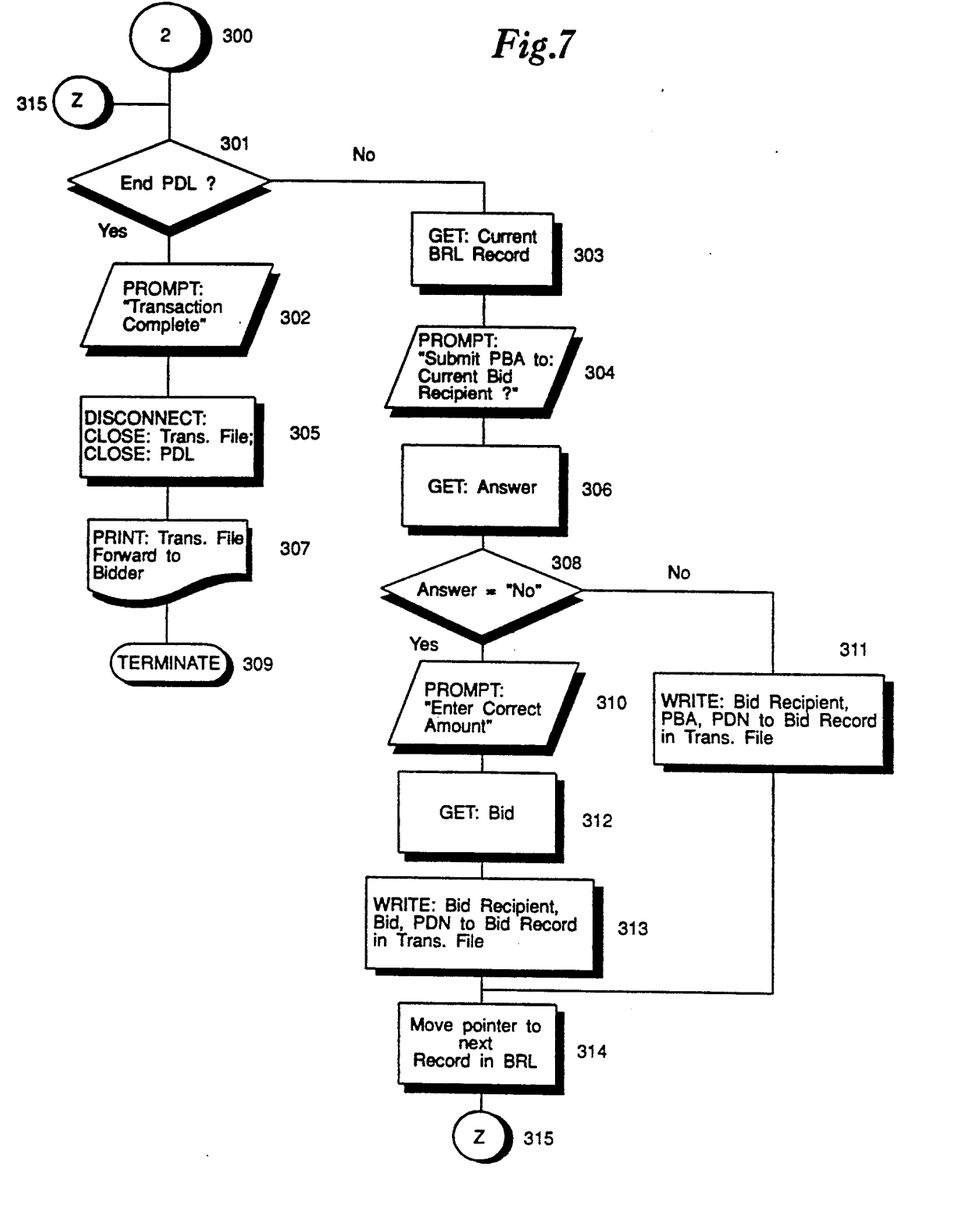
Figure 8:
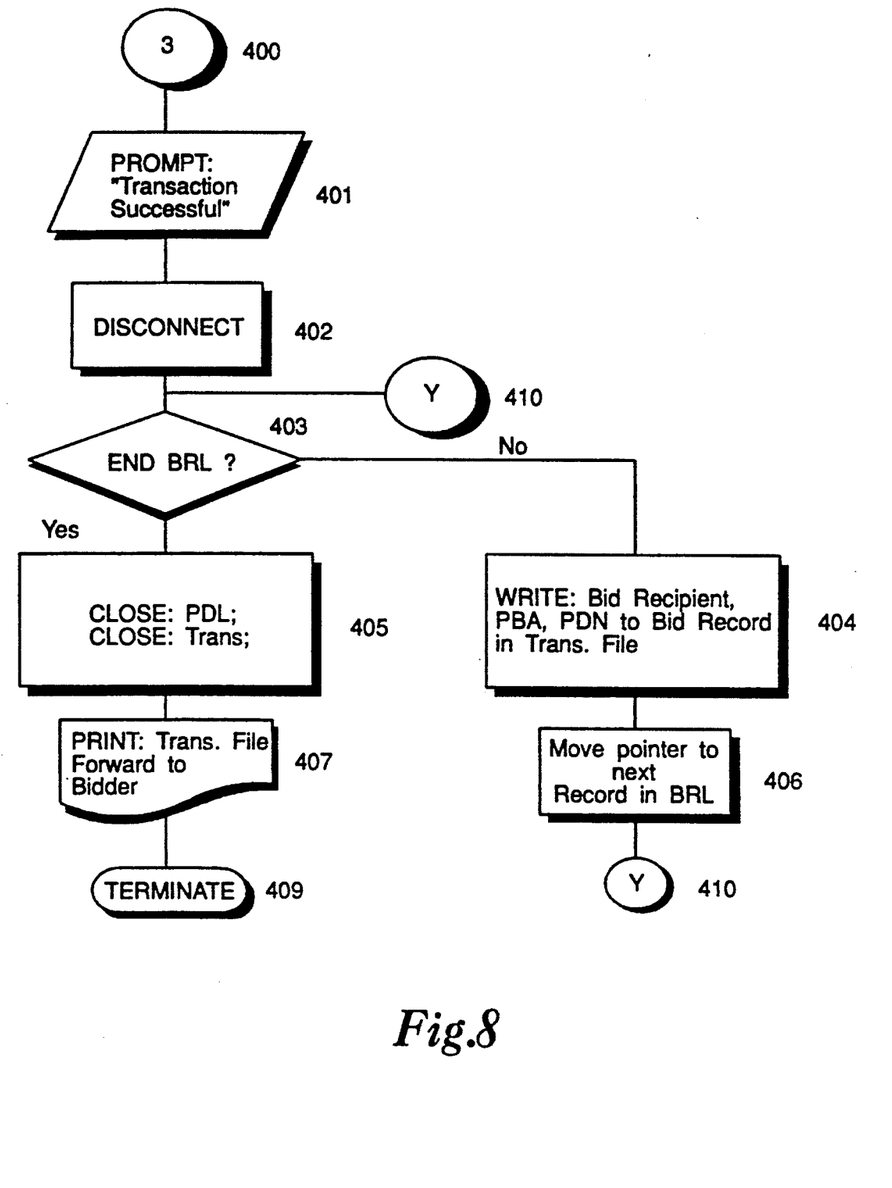
Figure 9:
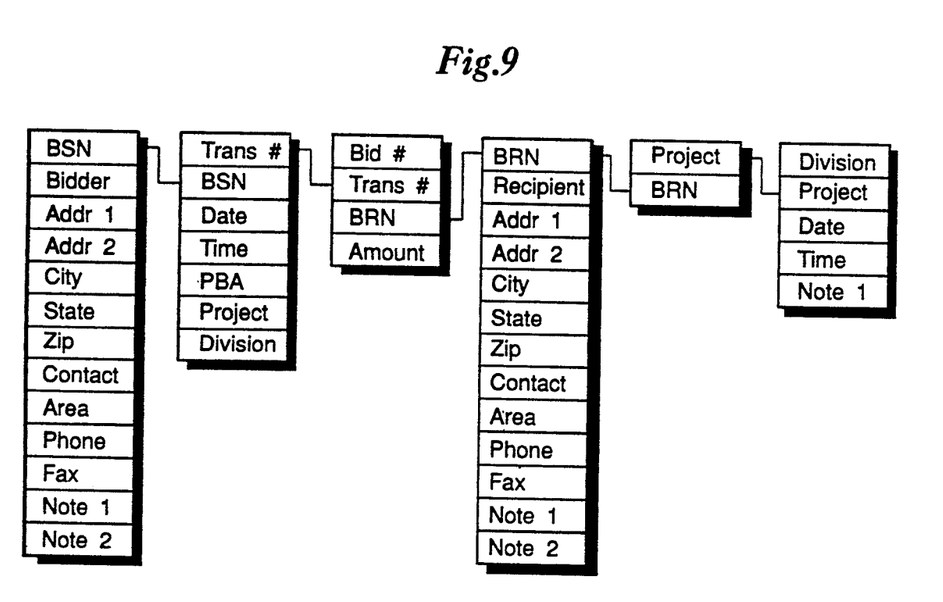
FIG. 9 is a sample file format for the invented system.

Prior to receiving bids, the system is set up to identify the various projects, divisions, bidders and bid recipients. Various file formats can be used to construct the software for use with the system. A sample format is shown in FIG. 6 for use with any of several off-the-shelf relational database products.

Referring to FIGS. 5 through 8, as soon as the bidder has gained access to the system via PBX (see Block 100) the PC computer creates a transaction record (Block 101) placing the time and date into the relevant field and starts to record the transaction via tape recorder 3. Next the bidder file is opened (Block 101) in preparation for validation. The user is then prompted (Block 102) via the speech synthesizer to speak his bidder security number (SBN). At this point the human operator enters via keyboard 8 the security number spoken by the bidder (Block 103). The PC computer attempts to match this against its list of valid SBN's contained in the bidder file (Block 104). The bidder is given two opportunities to provide a valid bidder security number (loop: 106, 109, 112, 115). In the event the bidder is unable to provide a valid security number, the PC computer informs the bidder of impending termination (Block 107) and disconnects the call deleting the transaction file (Block 110). Upon the entry of a valid bidder security number, the appropriate bidder record is retrieved (Block 105) and information from the bidder's individual record is cross-referenced to the transaction file (Block 108).

Next the bidder file is closed and the project file is opened (Block 114). At this point the PC computer prompts the bidder for the appropriate project and division number (Block 116). The bidder is then given several opportunities to provide a correct project and division number (Loop: 117, 201, 203, 205, 208). Upon receiving a valid project division number, the computer opens the project division list (Block 202). This file is the staging file from which the bids from all the bidders of a certain trade (division) are matched to all the bid recipients for a particular project and division, and are accumulated for formatting and processing. A bid recipient list is created (Block 204) containing all of the bid recipients for the division of the project on which the bidder wishes to bid. The bidder is prompted for a predominate bid amount (PBA) (Block 207). The predominate bid amount is the amount that the bidder intends to submit to a majority of the bid recipients. Once received, this amount is written into the transaction record (Block 213). The computer then inquires whether or not this amount is to be submitted to all of the bid recipients (Block 215). Upon receiving a response of yes, the bidder is presented with a disconnect message (Block 401) and the telephone connection is terminated (Block 402). At this stage the tape recorder is turned off and the recording is saved as a backup. The transaction is now posted into individual bid records and cross-referenced to the appropriate project and division along with each bid recipient's entry in the bid recipient file (Loop: 403, 404, 406, 410). After the PBA is posted any open file is closed (Block 405). A hard copy of the transaction file is then printed (Block 407). Finally the system is reset for the next caller.

If the bidder answers no to the prompt, the computer locates each bid recipient in turn and inquires whether or not the bidder wishes the predominate bid amount to be submitted to the current recipient (Block 304). At each individual prompt, if the bidder says yes the predominate bid amount contained in the transaction file is written into a bid record and cross-referenced to that bid recipient, project and division files (Block 311). Should the bidder say no, he is prompted for the amount which is then written into a bid record and cross-referenced to the bid recipient, project and division files (Blocks 310, 312, 313). Upon reaching the last bid recipient, the computer signals that the transaction is complete (Block 302), disconnects the phone, stops the tape recorder, and closes any open files (Block 305). A hard copy of the transaction file is then printed (Block 307).

At this point, no matter which path was taken, the computer saves the transaction file and reverts to the ready mode. The hard copy of the transaction is forwarded to the bidder to confirm his actions.

Figure 2:
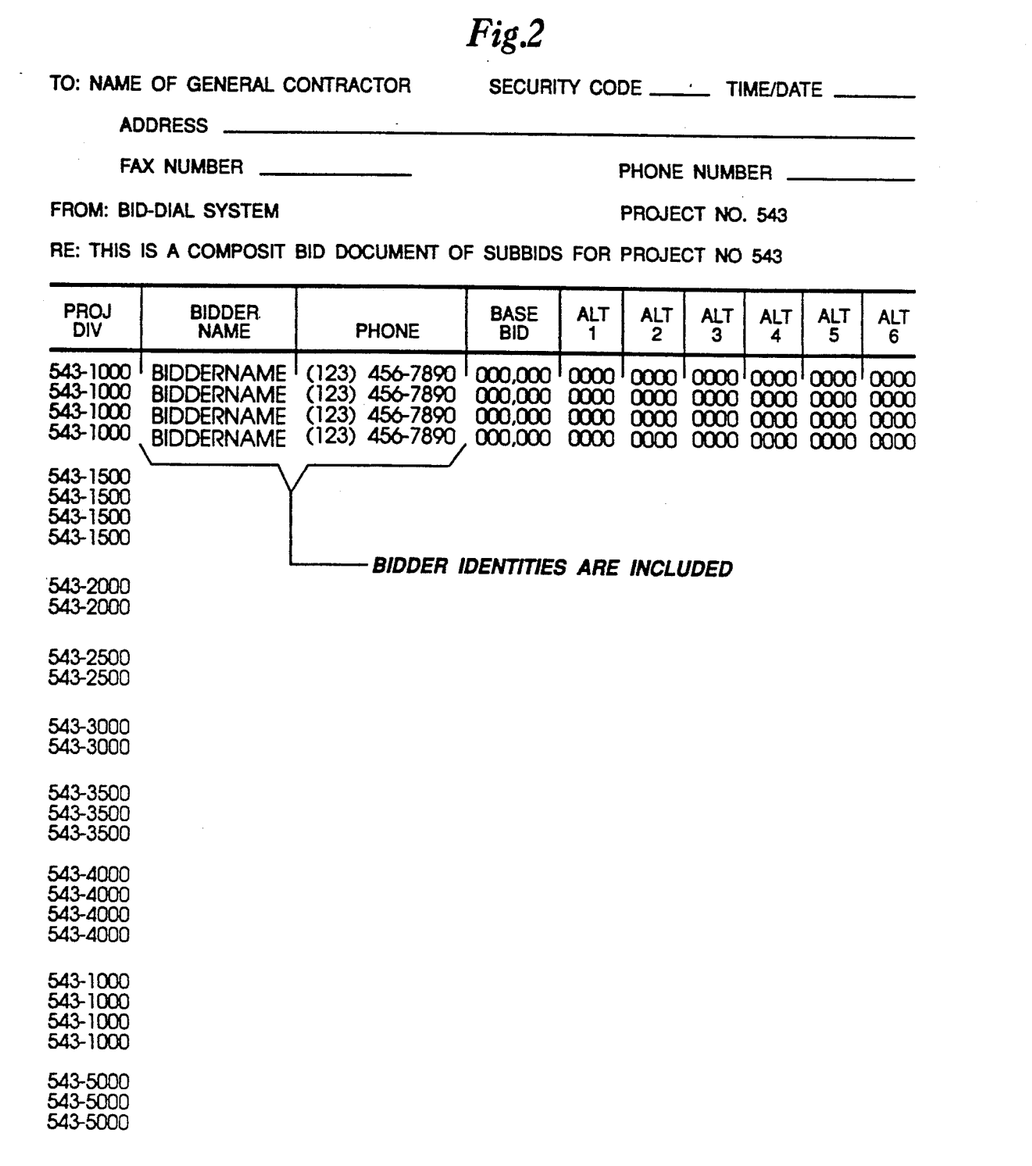
FIG. 2 is a sample bid document produced by the invented secure teleprocessing bidding system.
Figure 3:
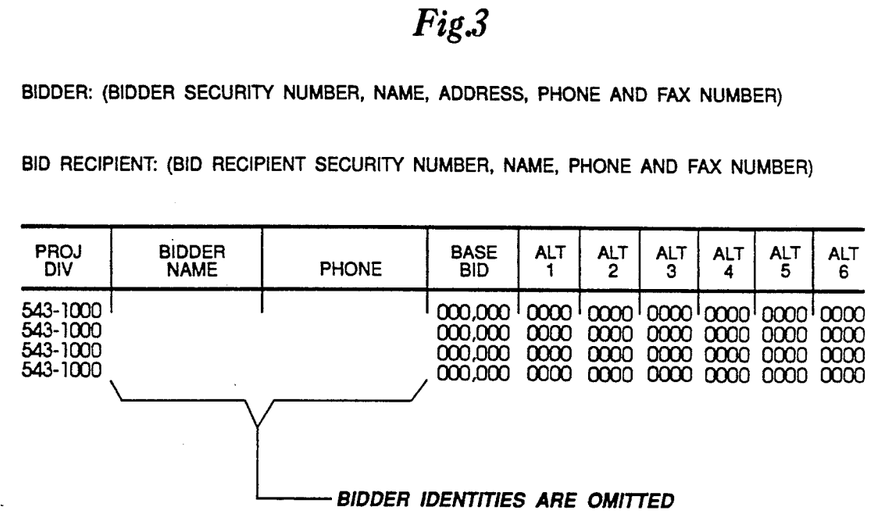
FIG. 3 is a mutually exclusive bid comparison report produced by the secure teleprocessing bidding system.

After the deadline for receiving the bids for a particular project, a sort of the bid recipient numbers, the project/division numbers, and bid amounts is performed for each division in the project/division file. This sort can be performed by a variety of well known algorithms. Based on the sorted data a bid document is prepared and formatted, see FIG. 2. This document is saved both in hard copy and electronically to provide an audit trail. Then based on the bid recipient's preference, this document is either mailed, sent by modem or faxed to his office. After the bid recipient has given his consent to the release of bid information, the computer system produces a comparison report (FIG. 3) for the bidders which preserves bidder identity. Then based on the bidder's preferences these documents are either mailed, faxed, or uploaded, allowing the bidders to compare their bids with the bids of other bidders.

ALTERNATIVE EMBODIMENTS

While the above described system utilizes a human operator in its preferred mode, it should be recognized that this system could be entirely contained within one computer. Such a system would utilize a fax/modem board with an electronic digital mail system whereby a bidder can either submit information, as before, directly to the computer equipped with synthesizer to produce a response, or the bidder can type his bid information in via touch-tone phones. A bidder could also submit his information, on a standardized form, via the fax which would be digitized and analyzed by the computer to produce the transaction file, or, similarly, the system could accept information directly via modem from another computer. After the bidder provides his security number and the project and division number the system could perform a check to determine whether the bidder has already entered a bid for that division and terminate the transaction if such a bid exists. During the report providing stage, reports could be either faxed to the recipient, uploaded into the recipient's computer, posted to a electronic bulletin board system, or a phone call could be initiated by the computer and a report issued verbally via speech synthesizer.

It is to be understood that the foregoing description and specific embodiments are merely illustrative of the best mode of the invention and the principles thereof, and that various modifications and additions may be made to the system by those skilled in the art, without departing from the spirit and scope of this invention, which is therefore understood to be limited only by the scope of the appended claims.

I claim:

1. A transaction processing system for conducting a secret competitive bidding procedure for at least one project having at least one division;
   said system including means for receiving at least one bid for said at least one division from at least one bidder;
   each bid including fields identifying the bidder, the bid recipient, the project, the division, and the bid amount;
   means for retrieving and storing each bid;
   means for refusing to accept bids on at least one project beyond a predetermined date;
   means for generating a bid recipient report for each bid identifying that bid recipient sorted by project, division, and bid amount;
   said bid recipient report including fields identifying the bidder, the project, the division, the amount of the bid;
   means for communicating said bid recipient report to said bid recipient after said predetermined date;
   means for generating a bidder report for each bidder of each bid received for the project and division for which said bidder submitted a bid;
   said bidder report including fields identifying the bid recipient, the project, the division, and the bid amount; and
   means for communicating said bidder report to said bidders at a second predetermined date.

2. The system according to claim 1 wherein said means for storing and retrieving said bid is a computer system having CPU, memory, monitor, keyboard, printer and modem.

3. The system according to claim 2 wherein said means for receiving bids is selected from the group consisting of: human operator, voice-to-text translator, speech synthesizer, fax, and scanner.

4. The system according to claim 2 wherein said means for refusing to accept bids comprises:
   a clock unit on said computer system adapted to provide the date and time; and
   means for comparing date provided by said clock unit to said predetermined date;
   whereby the actual date, as given by said computer system, is compared to the predetermined date and if said predetermined date is earlier than the actual date the transaction is terminated prior to receiving said bids.

5. The system according claim 2 wherein said means for communicating said bid recipient report to said bid recipient is selected from the group consisting of fax, mail, modem, and voice phone call.

6. The system according to claim 2 wherein said means for communicating said bidder report to said bidder is selected from the group consisting of fax, mail, modem, and voice phone call.

7. The system according to claim 1 further comprising means to verify the identity of each bidder.

8. The system according to claim 2 further comprising:
  means for receiving bidder identity records;
  means for assigning a unique security code to each bidder identity record;
  said identity record of valid bidders including fields identifying the name of the bidder, the address of the bidder, and the fax number of the bidder;
  means for retrieving and storing said identity record;
  means for prompting bidder to enter said unique security code prior to receiving said bid;
  means for receiving input from said bidder;
  means for comparing said input to said unique security codes assigned to said bidder identity records;
  means for terminating the transaction prior to receiving a bid if said input from said bidder is not assigned to said bidder identity records.

9. The system according to claim 2 wherein at least one bid comprises at least two bids.

10. The system according to claim 2 further comprising means for refusing to accept bids beyond a predetermined time on said predetermined date.

11. The system according to claim 2 further comprising means for preventing the retrieval of said bids, the generation of said bidder report and the generation of said bid recipient report until said predetermined date.

12. The system according to claim 11 wherein the means for preventing the retrieval of said bids comprises means for encryption of said bids prior to storage on said storage means.

13. The system according to claim 2 further comprising secondary means for recording the reception of the bid data;
  whereby an audit trail is provided.

14. The system according to claim 13 wherein said secondary means for recording is a tape recorder.

15. The system according to claim 8 further comprising means to terminate the transaction prior to receiving said bid if said bidder has already entered a bid for the particular bid recipient and project and division.

* * * * *